United States Patent
Pai

(10) Patent No.: US 7,146,828 B2
(45) Date of Patent: Dec. 12, 2006

(54) GLASS MOLDING DIE

(75) Inventor: Jui-Fen Pai, Taichung Hsien (TW)

(73) Assignee: Asia Opitcal Co., Inc., Taichung (TW)

( * ) Notice: Subject to any disclaimer, the term of this patent is extended or adjusted under 35 U.S.C. 154(b) by 234 days.

(21) Appl. No.: 10/805,746

(22) Filed: Mar. 22, 2004

(65) Prior Publication Data
US 2005/0138969 A1 Jun. 30, 2005

(30) Foreign Application Priority Data
Dec. 26, 2003 (TW) .............................. 92137067 A

(51) Int. Cl.
*C03B 11/08* (2006.01)
(52) U.S. Cl. .................................. 65/374.11
(58) Field of Classification Search ............... 65/374.11
See application file for complete search history.

(56) References Cited

U.S. PATENT DOCUMENTS

| | | | |
|---|---|---|---|
| 4,685,948 A * | 8/1987 | Kuribayashi et al. | 65/26 |
| 4,721,518 A * | 1/1988 | Monji et al. | 65/374.11 |
| 4,747,864 A * | 5/1988 | Hagerty et al. | 65/102 |
| 5,171,348 A * | 12/1992 | Umetani et al. | 65/374.11 |
| 5,676,723 A * | 10/1997 | Taniguchi et al. | 65/286 |
| 5,932,940 A * | 8/1999 | Epstein et al. | 310/40 MM |
| 6,119,485 A * | 9/2000 | Hibino et al. | 65/305 |

FOREIGN PATENT DOCUMENTS

| | | |
|---|---|---|
| JP | 62119128 | 5/1987 |
| JP | 62292637 | 12/1987 |
| TW | 087115743 | 9/1998 |
| TW | 445242 A * | 7/2001 |

* cited by examiner

Primary Examiner—Steven P. Griffin
Assistant Examiner—Queenie Dehghan
(74) Attorney, Agent, or Firm—Thomas, Kayden, Horstemeyer & Risley

(57) ABSTRACT

A molding die for molding glass thousand times is provided in the invention. The molding die includes a substrate, a first intermediate layer of Ni-containing Ir—Re alloy overlying the substrate, a second intermediate layer of metal-containing Ir—Re alloy overlying the first intermediate layer, and a passivation film overlying the second intermediate layer. The Ni concentration of the first intermediate layer decreases gradually with distance from the substrate/first intermediate layer interface. The metal is Cr, Ta, Ti, or Ti—Cr alloy. The metal concentration of the second intermediate layer increases with distance from the first intermediate layer/second intermediate layer interface.

59 Claims, 2 Drawing Sheets

GLASS MOLDING DIE

BACKGROUND OF THE INVENTION

1. Field of the Invention

The present invention relates to a glass molding die, and more specifically to a glass molding die for providing less surface roughness.,

2. Description of the Related Art

Glass molding dies for providing less surface roughness have been developed for many years, producing, for example, lifetimes of approximately 2000 cycles at working temperatures approximately 700° C. Monju discloses a passivation film of a substrate of a molding die using Ir—Mn—XN in JP62119128, wherein Mn can be replaced by Pt, Os, Pd, Rh, or Ru and XN can be replaced by a nitride of Ti, Cr, Ta, Nb, Si, B, Al, Hf, Zr, or V. Umetani et al. disclose a passivation film of a substrate of a molding die using Ir—(Re, Os)—Ta in JP62292637, wherein the content of Re and Os exceed 30% or 40%. Chu et al. disclose a passivation film of a substrate of a molding die using Ir—Re—CrN and an intermediate layer between the passivation film and substrate using Ir—Re—Ni alloy in TW445242, wherein the atomic ratio of Ir to Re is between 1 to 4 and 4 to 1 and the concentration of CrN is between 1 and 30 wt % in the passivation film. When the disclosed dies execute more than 2,000 times at working temperatures of approximately 700° C., the passivation films thereof frequently peel, limiting lifetime of the die.

SUMMARY OF THE INVENTION

Thus, an object of the present invention is to provide a glass molding die, featuring improved adhesion between layers thereof, thereby increasing lifetime, reducing preventive maintenance (PM), and conserving costs.

In order to achieve the described objects, the present invention provides a glass molding die having a substrate, a first intermediate layer of Ni-containing Ir—Re alloy overlying the substrate, a second intermediate layer of metal-containing Ir—Re alloy overlying the first intermediate layer, and a passivation film overlying the second intermediate layer. The Ni concentration of the first intermediate layer lowers gradually with distance from the substrate and first intermediate layer interface. The metal can be Cr, Ta, Ti, or Ti—Cr alloy, more highly concentrated in the second intermediate layer with distance from the first intermediate layer and second intermediate layer interface.

Further, an optional intermediate buffer layer between the first intermediate layer and second intermediate layer can further improve the adhesion therebetween.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

The following embodiments are intended to illustrate the invention more fully without limiting the scope of the claims, since numerous modifications and variations will be apparent to those skilled in the art.

First Embodiment

Figure 1:
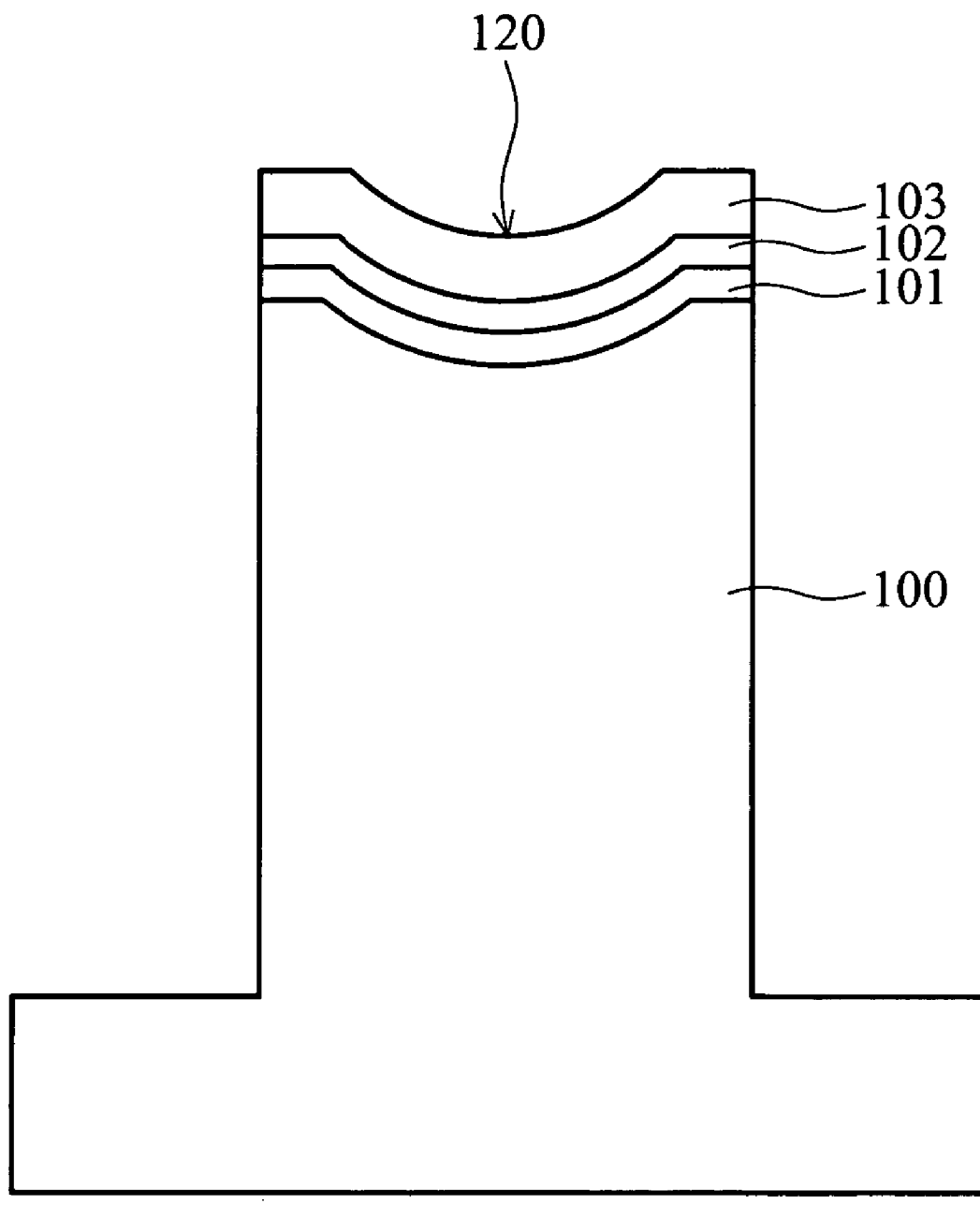
FIG. 1 is a cross-section of the molding die of the first embodiment of the present invention.

FIG. 1 is a cross-section of the molding die of the present invention. The structure of the molding die comprises a substrate 100, first intermediate layer 101, second intermediate layer 102, and passivation layer 103. The passivation layer 103 is preferably nitride containing Ir—Re alloy, wherein the nitride is chromium nitride, tantalum nitride, titanium nitride, or titanium chromium nitride. The passivation layer 103 further comprises a molding surface 120.

The substrate 100 is preferably tungsten carbide, containing Ni. Thus, the first intermediate layer 101 comprises Ni-containing Ir—Re alloy to improve adhesion between the substrate 100 and first intermediate layer 101. During formation the first intermediate layer 101, a surface of substrate 100 is ground and polished, followed by formation of a Ni-containing Ir—Re alloy layer as the first intermediate layer 101 overlying the polished surface of substrate 100 by, for example, co-sputtering using multiple targets. The first intermediate layer 101 is preferably about 0.1 to 0.3 μm thick. The atomic ratio of Ir to Re in the first intermediate layer 101 is between 99 to 1 and 70 to 30, and preferably between 99 to 1 and 90 to 10. The Ni concentration of the first intermediate layer 101 lowers gradually with distance from the substrate 100/first intermediate layer 101 interface to improve adhesion between the first intermediate layer 101 and subsequently described second intermediate layer 102.

When the first intermediate layer 101 is formed by co-sputtering using multiple targets, the polished substrate 100 is disposed in a chamber (not shown), followed by providing Ir target, Re target, Ni or Ni alloy target, and RF power (or DC power) to each target respectively according to the predetermined composition of the first intermediate layer 101, to form the first intermediate layer 101 overlying substrate 100, during which RF power to Ir target and Re target is constant, and to Ni or Ni alloy lowered gradually to a critical value (the lowest RF power sufficient to emit atoms from a target according to the target material, approximately 50 W of Ni) as the first intermediate layer 101 thickens. Power to Ni or Ni alloy is then cut. Thus, the minimum Ni concentration in the first intermediate layer 101 is between 5 and 10 at %. Moreover, the maximum Ni concentration in the first intermediate layer 101, in the substrate 100/first intermediate layer 101 interface is preferably between 20 and 30 at %.

Next, a second intermediate layer 102 is formed overlying the first intermediate layer 101 by, for example, co-sputtering using multiple targets. The second intermediate layer 102 is preferably formed immediately after the formation of the first intermediate layer 101. Metal targets such as Cr, Ta, Ti, or a combination thereof (as the desired composition of the second intermediate layer 102) can be provided. When the formation of first intermediate layer 101 is completed, the metal targets receive the critical RF power thereof, still provided to the Ir target and Re target to form the second intermediate layer 102. The RF power providing to the metal target increases gradually as the second intermediate layer 102 thickens, until completion of the formation of the second intermediate layer 102. The second intermediate layer 102 is preferably about 0.1 to 0.3 μm thick. The atomic ratio of Ir to Re in the second intermediate layer 102 is between 99 to 1 and 70 to 30, and preferably between 99 to 1 and 90 to 10.

When the second intermediate layer 102 is Cr-containing Ir—Re, the minimum Cr concentration thereof, of first intermediate layer 101/second intermediate layer 102 interface, is at least more than 0 at %, rising gradually with distance therefrom to a maximum value preferably between 40 and 50 at % at the top of the second intermediate layer 102 (the subsequent second intermediate layer 102/passivation film 103 interface). Thereafter, it is preferred that final RF power be maintained to the Ir, Re, and Cr targets of the formation of the second intermediate layer 102, followed by nitrogen flow into the chamber to form a chromium-nitride containing Ir—Re alloy layer as a passivation film 103 preferably about 0.5 to 2 µm thick. The atomic ratio of Ir to Re in the passivation film 103 is between 99 to 1 and 70 to 30, and preferably between 99 to 1 and 90 to 10. The chromium nitride concentration in the passivation film 103 is preferably between 4 and 40 at %.

When the second intermediate layer 102 is Ta-containing Ir—Re, the minimum Ta concentration thereof, of first intermediate layer 101/second intermediate layer 102 interface, is at least more than 0 at %, rising gradually with distance therefrom to a maximum value preferably between 20 and 25 at % at the top of the second intermediate layer 102 (the subsequent second intermediate layer 102/passivation film 103 interface). Thereafter, it is preferred that final RF power be maintained to the Ir, Re, and Ta targets of the formation of the second intermediate layer 102, followed by nitrogen flow into the chamber to form a tantalum-nitride containing Ir—Re alloy layer as a passivation film 103 preferably about 0.5 to 2 µm thick. The atomic ratio of Ir to Re in the passivation film 103 is between 99 to 1 and 70 to 30, and preferably between 99 to 1 and 90 to 10. The tantalum nitride concentration in the passivation film 103 is preferably between 3 and 30 at %.

When the second intermediate layer 102 is Ti-containing Ir—Re, the minimum Ti concentration thereof, of first intermediate layer 101/intermediate layer 102 interface, is at least more than 0 at %, rising gradually with distance therefrom to a maximum value preferably between 20 and 25 at % at the top of the second intermediate layer 102 (the subsequent second intermediate layer 102/passivation film 103 interface). Thereafter, it is preferred that final RF power be maintained to the Ir, Re, and Ti targets of the formation of the second intermediate layer 102, followed by nitrogen flow into the chamber to form a titanium-nitride containing Ir—Re alloy layer as a passivation film 103 preferably about 0.5 to 2 µm thick. The atomic ratio of Ir to Re in the passivation film 103 is between 99 to 1 and 70 to 30, and preferably between 99 to 1 and 90 to 10. The titanium nitride concentration in the passivation film 103 is preferably between 3 and 30 at %.

When the second intermediate layer 102 is Ti—Cr alloy containing Ir—Re, the minimum Ti—Cr alloy concentration thereof, of first intermediate layer 101/second intermediate layer 102 interface, is at least more than 0 at %, rising gradually with distance therefrom to a maximum value preferably between 30 and 38 at % at the top of the second intermediate layer 102 (the subsequent second intermediate layer 102/passivation film 103 interface). Thereafter, it is preferred that final RF power be maintained to the Ir, Re, Ti, and Cr targets of the formation of the second intermediate layer 102, followed by nitrogen flow into the chamber to form a titanium-chromium-nitride containing Ir—Re alloy layer as a passivation film 103 preferably about 0.5 to 21 µm thick. The atomic ratio of Ir to Re in the passivation film 103 is between 99 to 1 and 70 to 30, and preferably between 99 to 1 and 90 to 10. The titanium chromium nitride concentration in the passivation film 103 is preferably between 10 and 40 at %.

As described, both the first intermediate layer 101 and substrate 100 of the molding die 1 contain Ni, resulting in improved adhesion therebetween. The Ni concentration in the first intermediate layer 101 lowers gradually with distance from the substrate 100/first intermediate layer 101 interface to the first intermediate layer 101/second intermediate layer 102 interface, and the Cr, Ta, Ti, or Ti—Cr alloy concentration rises gradually with distance from the first intermediate layer 101/second intermediate layer 102 interface, reducing composition difference between the first intermediate layer 101 and second intermediate layer 102, improving adhesion therebetween. Finally, when the nitride in the passivation film 103 is the nitride of the metal in the Ir—Re alloy of the second intermediate layer 102, adhesion therebetween can be also improved. Thus, lifetime of the molding die at working temperature of approximately 700° C. in the present invention can increase to about 3,000 to 4,000 cycles and decrease the frequency of PM and process cost, thereby achieving the objects of the present invention.

Second Embodiment

In the first embodiment, the first intermediate layer 101 and second intermediate layer 102 are formed by co-sputtering using multiple targets. The composition gap therebetween is lowered to improve adhesion therebetween, thereby achieving the objects of the present invention. However, in the first embodiment, composition gaps still exist between the first intermediate layer 101 and second intermediate layer 102.

Figure 2:
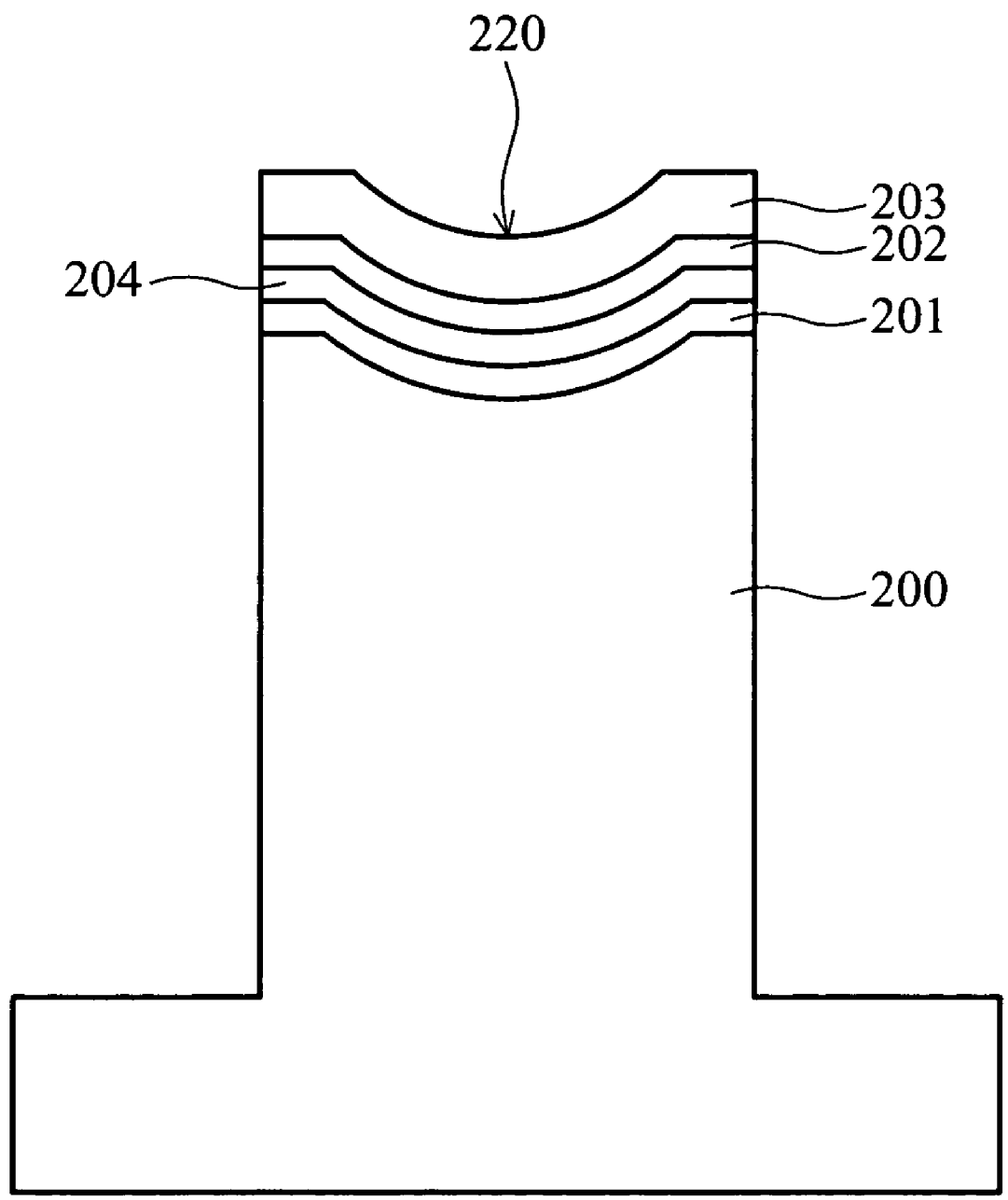
FIG. 2 is a cross-section of the molding die of the second embodiment of the present invention.

FIG. 2 is a cross-section of the molding die according to this embodiment of the present invention. The structure of the molding die comprises a substrate 200, first intermediate layer 201, intermediate buffer layer 204, second intermediate layer 202, and passivation layer 203. The passivation layer 203 is preferably nitride containing Ir—Re alloy, wherein the nitride is chromium nitride, tantalum nitride, titanium nitride, or titanium chromium nitride. The passivation layer 203 further comprises a molding surface 220.

The substrate 200 is preferably tungsten carbide, containing Ni. Thus, the first intermediate layer 201, equivalent to the first intermediate layer 101 of the first embodiment, is Ni-containing Ir—Re alloy to improve adhesion between the substrate 200 and first intermediate layer 201. Details regarding the first intermediate layer 201 are the same those of the first intermediate layer 101 in the first embodiment, and thus, are omitted herefrom.

Next, an intermediate buffer layer 204 of Ir—Re alloy with no other metal composition is formed overlying the first intermediate layer 201 by co-sputtering, using the same RF power provided to Ir Re targets during formation of the first intermediate layer 201. The RF power is still constant during this formation. The atomic ratio of Ir to Re in the intermediate buffer layer 204 is between 99 to 1 and 70 to 30, and preferably between 99 to 1 and 90 to 10. The intermediate buffer layer 204, preferably about 0.01 to 0.1 µm thick, further reduces composition gradient between the first intermediate layer 201 and the subsequently formed second intermediate layer 202, further improving adhesion therebetween.

Next, a second intermediate layer 202, equivalent to the second intermediate layer 102 of the first embodiment, is formed overlying the intermediate buffer layer 204 and a passivation film 203, equivalent to the passivation film 103 of the first embodiment, is formed overlying second intermediate layer 202 by, for example, co-sputtering using multiple targets. Details of the second intermediate layer 202 and passivation film 203 are the same as those of second intermediate layer 102 and passivation film 103 in the first embodiment, and thus, are omitted herefrom.

Finally, an example of the formation of the molding die 2 of the present invention is provided. Note that the process parameters provided subsequently, such as RF power, deviation rate of RF power, sputtering time, and desired composition are only examples, and are not intended to limit the scope of the present invention. Those skilled in the art will recognize the possibility of using many possible process parameters, to obtain the molding die of the present invention.

EXAMPLE

A substrate 200 of tungsten carbide was disposed in a chamber (not shown), followed by formation of a first intermediate layer 201 of Ir—Re—Ni alloy using sputtering, at initial RF power of approximately 400 W to the Ir target, 100 W to the Re target, and 200 W to the Ni target. During formation of first intermediate layer 201, the RF power to the Ir and Re targets was kept constant and to the Ni target lowered from approximately 200 W to approximately 50 W at a rate of approximately 15 W/min. and then cut, completing formation of the first intermediate layer 201. Thereafter, the RF power to the Ir and Re targets was kept constant for approximately 5 minutes to complete formation of intermediate buffer layer 204. Further, the second intermediate layer 202 was formed using sputtering, using initial RF powers of approximately 400 W to the Ir target, 100 W to the Re target, and 100 W to the Cr target. During formation of second intermediate layer 202, the RF power providing to the Ir and Re targets was kept constant and the RF power to the Cr target rose from approximately 100 W to approximately 300 W at a rate of approximately 50 W/min., constant for approximately 2 minutes. Finally, a passivation film 203 was formed using sputtering, under the same parameters as when completing the second intermediate layer 202 in a nitrogen atmosphere. After 5 minutes, the formation of passivation film 203 was completed, thereby finishing the formation of molding die 2 of the present invention.

Although the present invention has been particularly shown and described with reference to the preferred specific embodiments and examples, it is anticipated that alterations and modifications thereof will no doubt become apparent to those skilled in the art. It is therefore intended that the following claims be interpreted as covering all such alteration and modifications as fall within the true spirit and scope of the present invention.

What is claimed is:

1. A molding die for molding glass, comprising:
   a substrate;
   a first intermediate layer of Ni-containing Ir—Re alloy overlying the substrate, with Ni concentration decreasing with distance from the substrate/first intermediate layer interface;
   a second intermediate layer of metal-containing Ir—Re alloy overlying the first intermediate layer, the metal selected from a group consisting of Cr, Ta, Ti, and Ti—Cr alloy, in concentration increasing with distance from the first intermediate layer/second intermediate layer interface; and
   a passivation film overlying the second intermediate layer.

2. The molding die as claimed in claim 1, wherein the substrate comprises tungsten carbide.

3. The molding die as claimed in claim 1, wherein maximum Ni concentration of the first intermediate layer is between 20 and 30 at %.

4. The molding die as claimed in claim 1, wherein minimum Ni concentration of the first intermediate layer is between 5 and 10 at %.

5. The molding die as claimed in claim 1, wherein atomic ratio of Ir to Re of the first intermediate layer is between 99 to 1 and 70 to 30.

6. The molding die as claimed in claim 1, wherein atomic ratio of Ir to Re of the first intermediate layer is between 99 to 1 and 90 to 10.

7. The molding die as claimed in claim 1, wherein the thickness of first intermediate layer is about 0.1 to 0.3 μm.

8. The molding die as claimed in claim 1, wherein maximum Cr concentration of the second intermediate layer is between 40 and 50 at %.

9. The molding die as claimed in claim 1, wherein Cr concentration of the second intermediate layer is at least higher than 0 at %.

10. The molding die as claimed in claim 1. wherein maximum Ta concentration of the second intermediate layer is between 20 and 25 at %.

11. The molding die as claimed in claim 1, wherein Ta concentration of the second intermediate layer is at least higher than 0 at %.

12. The molding die as claimed in claim 1, wherein maximum Ti concentration of the second intermediate layer is between 20 and 25 at %.

13. The molding die as claimed in claim 1, wherein Ti concentration of the second intermediate layer is at least higher than 0 at %.

14. The molding die as claimed in claim 1, wherein maximum Ti—Cr alloy concentration of the second intermediate layer is between 30 and 38 at %.

15. The molding die as claimed in claim 1, wherein Ti—Cr alloy concentration of the second intermediate layer is at least higher than 0 at %.

16. The molding die as claimed in claim 1, wherein atomic ratio of Ir to Re of the second intermediate layer is between 99 to 1 and 70 to 30.

17. The molding die as claimed in claim 1, wherein atomic ratio of Ir to Re of the second intermediate layer is between 99 to 1 and 90 to 10.

18. The molding die as claimed in claim 1, wherein the thickness of second intermediate layer is about 0.1 to 0.3 μm.

19. The molding die as claimed in claim 1, wherein the passivation film comprises nitride-containing Ir—Re alloy.

20. The molding die as claimed in claim 19, wherein atomic ratio of Ir to Re of the passivation film is between 99 to 1 and 70 to 30.

21. The molding die as claimed in claim 19, wherein atomic ratio of Ir to Re of the passivation film is between 99 to 1 and 90 to 10.

22. The molding die as claimed in claim 19, wherein the nitride is chromium nitride, tantalum nitride, titanium nitride, or titanium chromium nitride.

23. The molding die as claimed in claim 22, wherein the nitride is chromium nitride when the metal is Cr.

24. The molding die as claimed in claim 22, wherein the nitride is tantalum nitride when the metal is Ta.

25. The molding die as claimed in claim 22, wherein the nitride is titanium nitride when the metal is Ti.

26. The molding die as claimed in claim 22. wherein the nitride is titanium chromium nitride when the metal is Ti—Cr alloy.

27. The molding die as claimed in claim 1, wherein the thickness of passivation film is about 0.5 to 2 μm.

28. The molding die as claimed in claim 1, wherein the passivation film comprises a molding surface.

29. A molding die for molding glass, comprising:
    a substrate;

a first intermediate layer of Ni-containing Ir—Re alloy overlying the substrate, with Ni concentration decreasing with distance from the substrate/first intermediate layer interface;

an intermediate buffer layer of Ir—Re alloy overlying the substrate;

a second intermediate layer of metal-containing Ir—Re alloy overlying the intermediate buffer layer, the metal selected from a group consisting of Cr, Ta, Ti, and Ti—Cr alloy, in concentration increasing with distance from the intermediate buffer layer/second intermediate layer interface; and a passivation film overlying the second intermediate layer.

30. The molding die as claimed in claim 29, wherein the substrate is tungsten carbide.

31. The molding die as claimed in claim 29, wherein maximum Ni concentration of the first intermediate layer is between 20 and 30 at %.

32. The molding die as claimed in claim 29, wherein minimum Ni concentration of the first intermediate layer is between 5 and 10 at %.

33. The molding die as claimed in claim 29, wherein atomic ratio of Ir to Re of the first intermediate layer is between 99 to 1 and 70 to 30.

34. The molding die as claimed in claim 29, wherein atomic ratio of Ir to Re of the first intermediate layer is between 99 to 1 and 90 to 10.

35. The molding die as claimed in claim 29, wherein the thickness of first intermediate layer is about 0.1 to 0.3 μm.

36. The molding die as claimed in claim 29, wherein maximum Cr concentration of the second intermediate layer is between 40 and 50 at %.

37. The molding die as claimed in claim 29, wherein Cr concentration of the second intermediate layer is at least higher than 0 at %.

38. The molding die as claimed in claim 29, wherein maximum Ta concentration of the second intermediate layer is between 20 and 25 at %.

39. The molding die as claimed in claim 29, wherein Ta concentration of the second intermediate layer is at least higher than 0 at %.

40. The molding die as claimed in claim 29, wherein maximum Ti concentration of the second intermediate layer is between 20 and 25 at %.

41. The molding die as claimed in claim 29, wherein Ti concentration of the second intermediate layer is at least higher than 0 at %.

42. The molding die as claimed in claim 29, wherein maximum Ti—Cr alloy concentration of the second intermediate layer is between 30 and 38 at %.

43. The molding die as claimed in claim 29, wherein Ti—Cr alloy concentration of the second intermediate layer is at least higher than 0 at %.

44. The molding die as claimed in claim 29, wherein atomic ratio of Ir to Re of the second intermediate layer is between 99 to 1 and 70 to 30.

45. The molding die as claimed in claim 29, wherein atomic ratio of Ir to Re of the second intermediate layer is between 99 to 1 and 90 to 10.

46. The molding die as claimed in claim 29, wherein the thickness second intermediate layer is about 0.1 to 0.3 μm.

47. The molding die as claimed in claim 29, wherein atomic ratio of Ir to Re of the intermediate buffer layer is between 99 to 1 and 70 to 30.

48. The molding die as claimed in claim 29, wherein atomic ratio of Ir to Re of the intermediate buffer layer is between 99 to 1 and 90 to 10.

49. The molding die as claimed in claim 29, wherein the thickness of intermediate buffer layer is about 0.01 to 0.1 μm.

50. The molding die as claimed in claim 29, wherein the passivation film is nitride-containing Ir—Re alloy.

51. The molding die as claimed in claim 50, wherein atomic ratio of Ir to Re of the passivation film is between 99 to 1 and 70 to 30.

52. The molding die as claimed in claim 50, wherein atomic ratio of Ir to Re of the passivation film is between 99 to 1 and 90 to 10.

53. The molding die as claimed in claim 50, wherein the nitride is chromium nitride, tantalum nitride, titanium nitride, or titanium chromium nitride.

54. The molding die as claimed in claim 53, wherein the nitride is chromium nitride when the metal is Cr.

55. The molding die as claimed in claim 53, wherein the nitride is tantalum nitride when the metal is Ta.

56. The molding die as claimed in claim 53, wherein the nitride is titanium nitride when the metal is Ti.

57. The molding die as claimed in claim 53, wherein the nitride is titanium chromium nitride when the metal is Ti—Cr alloy.

58. The molding die as claimed in claim 29, wherein the thickness of passivation film is about 0.5 to 2 μm.

59. The molding die as claimed in claim 29, wherein the passivation film comprises a molding surface.

* * * * *